United States Patent
Sharma et al.

(10) Patent No.: US 12,327,109 B2
(45) Date of Patent: Jun. 10, 2025

(54) MICRO FRONTEND FRAMEWORK FOR REDEPLOYMENT OF SPECIFIC CHUNKS OF EXISTING APPLICATION BUILD

(71) Applicant: Rakuten Symphony, Inc., Tokyo (JP)

(72) Inventors: Keshav Sharma, Indore (IN); Aditya Budholiya, Indore (IN); Durgesh Rathore, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 18/023,533

(22) PCT Filed: Feb. 1, 2023

(86) PCT No.: PCT/US2023/012094
§ 371 (c)(1),
(2) Date: Feb. 27, 2023

(87) PCT Pub. No.: WO2024/136908
PCT Pub. Date: Jun. 27, 2024

(65) Prior Publication Data
US 2025/0077224 A1   Mar. 6, 2025

(30) Foreign Application Priority Data
Dec. 19, 2022 (IN) .............................. 202221073575

(51) Int. Cl.
*G06F 9/445* (2018.01)
*G06F 8/61* (2018.01)
(Continued)

(52) U.S. Cl.
CPC .................................... *G06F 8/658* (2018.02)

(58) Field of Classification Search
CPC ..... G06F 8/41; G06F 8/70; G06F 8/71; G06F 8/38; G06F 8/447; G06F 8/427; G06F 8/34; G06F 9/455; G06F 9/445; G06F 9/50
See application file for complete search history.

(56) References Cited

U.S. PATENT DOCUMENTS 10,341,198 B2 *   7/2019   Chugtu ................... H04L 67/56
11,442,830 B2 *   9/2022   Woods .................... G06F 9/455
(Continued)

OTHER PUBLICATIONS

International Search Report issued Jun. 7, 2023 in International Application No. PCT/US23/12094.
(Continued)

*Primary Examiner* — Thuy Dao
(74) *Attorney, Agent, or Firm* — Sughrue Mion, PLLC

(57) ABSTRACT

Embodiments herein provide a method for handling redeployment of an existing application build. The method includes receiving a build creation command message for redeployment of the existing application build. Further, the method includes determining availability of a module input, a client input, a workspace input, and an application input in the build creation command message. Further, the method includes determining specific chunks of the existing application build for redeployment based on the module input, the client input, the workspace input, and the application input available in the build creation command message. Further, the method includes redeploying the specific chunks of the existing application build.

16 Claims, 15 Drawing Sheets

(51) Int. Cl.
*G06F 8/65* (2018.01)
*G06F 8/658* (2018.01)
*G06F 8/71* (2018.01)
*G06F 9/455* (2018.01)
*G06F 9/46* (2006.01)
*G06F 15/16* (2006.01)

(56) References Cited

U.S. PATENT DOCUMENTS

2019/0102157 A1  4/2019  Caldato et al.
2022/0368763 A1  11/2022  Grozdanov et al.

OTHER PUBLICATIONS

Written Opinion issued Jun. 7, 2023 in International Application No. PCT/US23/12094.

* cited by examiner

MICRO FRONTEND FRAMEWORK FOR REDEPLOYMENT OF SPECIFIC CHUNKS OF EXISTING APPLICATION BUILD

CROSS-REFERENCE TO RELATED APPLICATION

This application is a National Stage of International Application No. PCT/US2023/012094, filed Feb. 1, 2023, claiming priority based on Indian Provisional Application No. 20/222,1073575, filed on Dec. 19, 2022, the disclosure of which is incorporated herein by reference in its entirety.

FIELD OF INVENTION

The present disclosure relates to a micro frontend framework, and more particularly to the micro frontend framework (or system) and a method for handling redeployment of specific chunks of an existing application build.

BACKGROUND

In general, every time to fix anything in an application, a complete build is deployed in the application running in a micro frontend framework. Also, a service provider had to manage separate repos for multiple clients, and code fixes needed to be deployed in all the repos of all the clients in the micro frontend framework. The user wanted a tool by which the user can make production build of specific feature/module so that the user can deploy it independently without deploying complete build. In an example, suppose the user have developed a new feature/module to show user's information and now the user want to deploy it on the server then with the help of the tool, the user can create the build of only that feature/module and now the user can deploy it. In another example, suppose the end user has reported an issue in the user information feature then the developer will fix that issue and make build of that feature/module and deploy it by replacing the existing bundle with new one. Hence in the conventional system, complete build need to be deployed every time when anything need to be fixed in the application. Also when separate repos for multiple clients are managed then code fixes needs to be deployed in all the repos of all the clients.

Thus, it is desired to address the above-mentioned disadvantages or other shortcomings or at least provide a useful alternative.

OBJECT OF INVENTION

The principal object of the embodiments herein is to provide a micro frontend framework (or system) and a method for redeployment of specific chunks of existing application build. The method can be used to enable a user to deploy small chunks (i.e., features) of the application that has to be fixed. The method or the system enables the user to have a single repo that can manage the changes with respect to all the clients, there is no need to manage separate repos for each of the clients. An output of the method is lazy loading friendly. The process thoroughly checks a syntax error in a source code. The method is compatible with a legacy platform.

Another object of the embodiments herein is to provide the system on a server that allows a user to prepare and deploy specific chunks (i.e., features) of a build of an existing application service independently, where the system comprises a set of sequential processes that receive a module that needs to be deployed on the system. The system consists of a JSON file having a plurality of meta-information and its module identifier (ID), where a plurality of meta-information combined is a specific chunk (features).

Another object of the embodiments herein is to provide the system determining for any client input/requirements, if the client input is provided then all the existing JSON files of a client build are downloaded and a received module and downloaded modules are merged together and re-uploaded to the client build.

Another object of the embodiments herein is to provide the system determining for multiple workspaces where a workspace is a combination of a plurality of modules (making a superset JSON), and if multiple workspaces are present then the system further checks for a get input, wherein a get input is a command to import specific chunks of an existing module among multiple workspace that can be deployed in the system.

Yet, another object of the embodiments herein is to provide that if multiple workspaces are not provided, the system finds a path of the module that is to be deployed and a source code of the module is copied from a source directory to a destination folder and hence the deployed module will be replaced by new module. Further, the system determines if a client input is present or not and if the client input is present, the module on the destination folder will be replaced by a clients input module.

Yet, another object of the embodiments herein is to provide the system merging the existing module and the input module and replaces the existing module with the merged module for one or more workspace, also changes the path of the module as the module file location has changed.

Yet, another object of the embodiments herein is to provide a system checking for any syntax error, if the error is not present then the code syntax is generalized such that the code can run on any server, then the code is compressed to make the system fast and secure.

SUMMARY

Accordingly, the embodiment herein discloses a system for redeployment of an existing application build. The system includes at least one processor and a memory operatively coupled to the at least one processor. The at least one processor is configured to receive a build creation command message for redeployment of the existing application build. Further, the at least one processor is configured to determine availability of a module input, a client input, a workspace input, and an application input in the build creation command message. Further, the at least one processor is configured to determining specific chunks of the existing application build for redeployment based on the module input, the client input, the workspace input, and the application input available in the build creation command message. Further, the at least one processor is configured to redeploying the specific chunks of the existing application build.

Accordingly, the embodiment herein discloses a method for handling redeployment of an existing application build. The method includes receiving a build creation command message for redeployment of the existing application build. Further, the method includes determining availability of a module input, a client input, a workspace input, and an application input in the build creation command message. Further, the method includes determining specific chunks of the existing application build for redeployment based on the module input, the client input, the workspace input, and the application input available in the build creation command message. Further, the method includes redeploying the specific chunks of the existing application build.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF FIGURES

The method and the system are illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
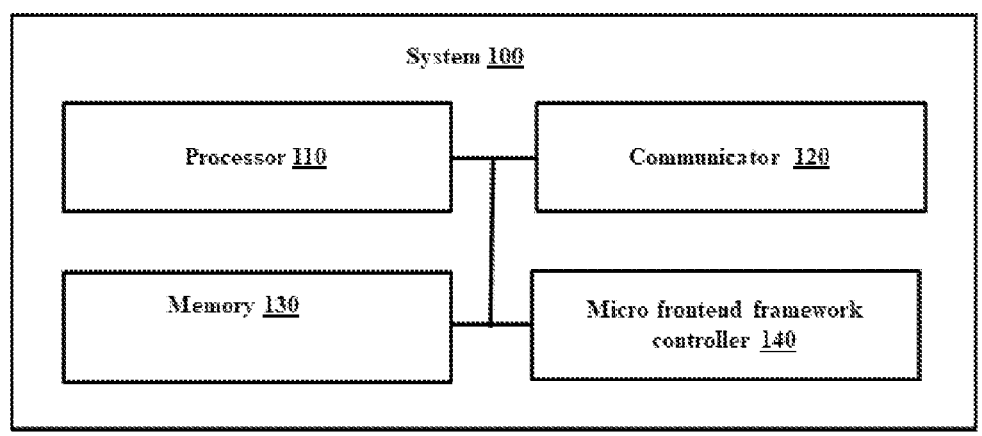
FIG. 1 is an example overview of a system (or micro frontend framework) for handling redeployment of an existing application build, according to the embodiments as disclosed herein.
Figure 2A:
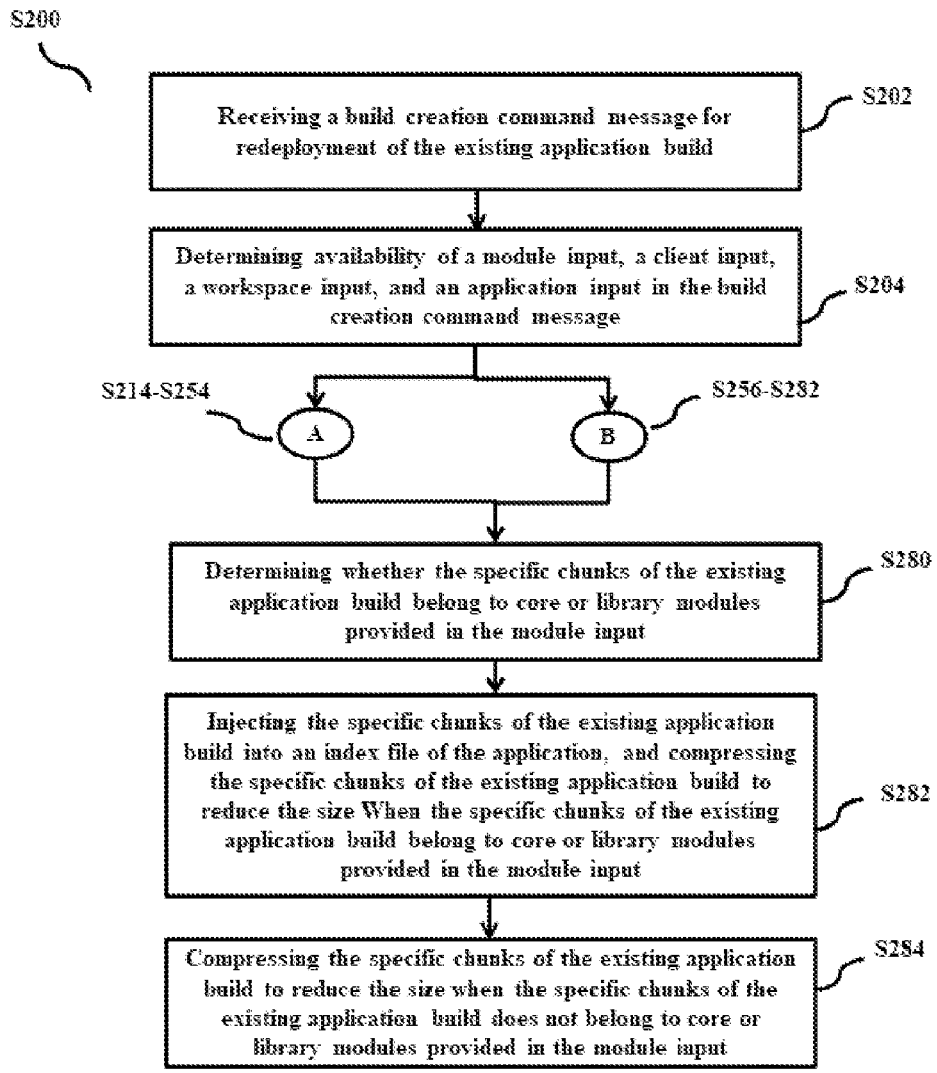
FIG. 2A to FIG. 2F are flow charts illustrating a method for handling the redeployment of the existing application build, according to the embodiments as disclosed herein.
Figure 2B:
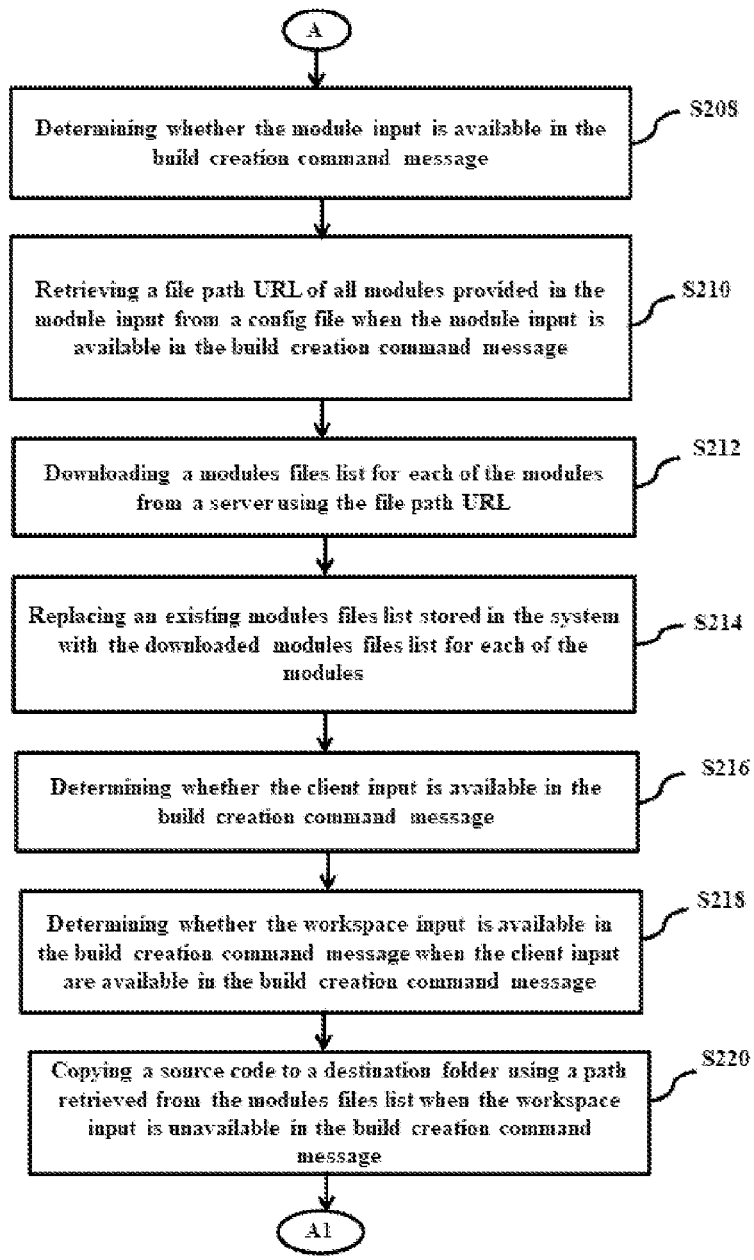
Figure 2C:
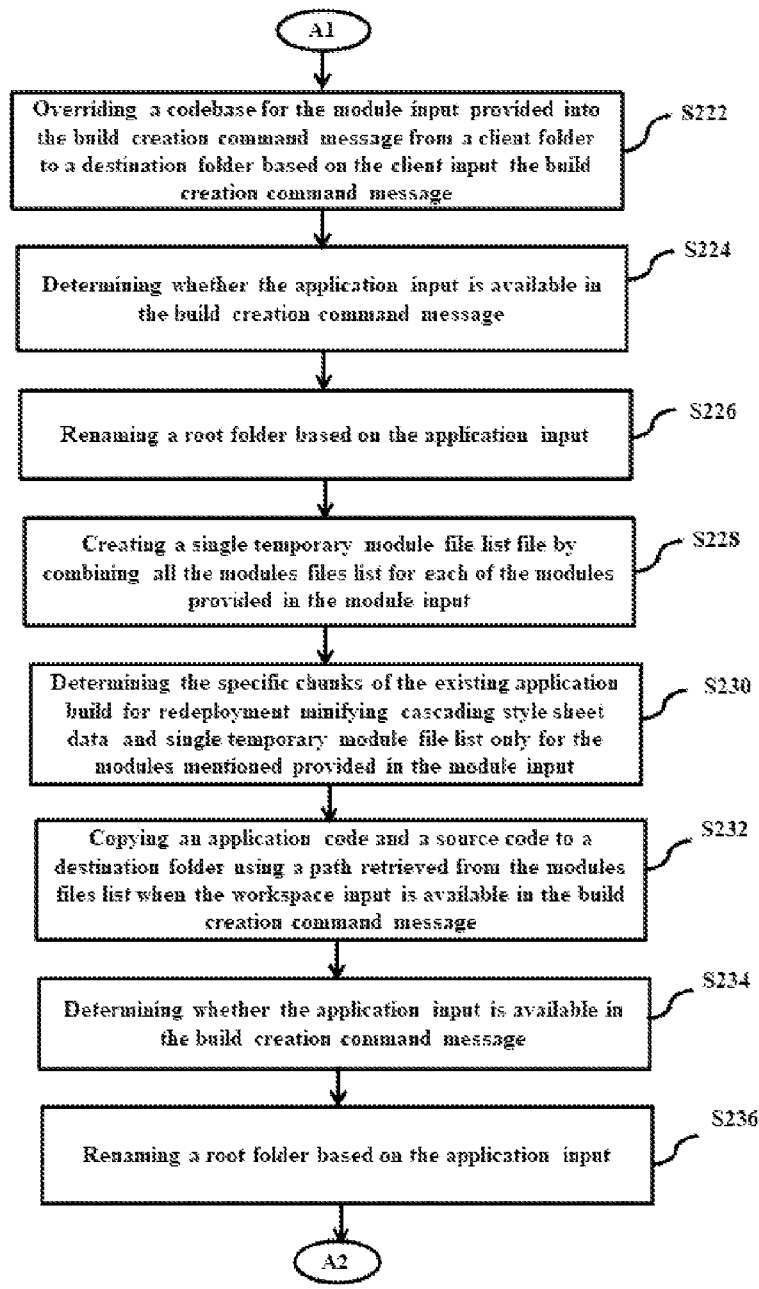
Figure 2D:
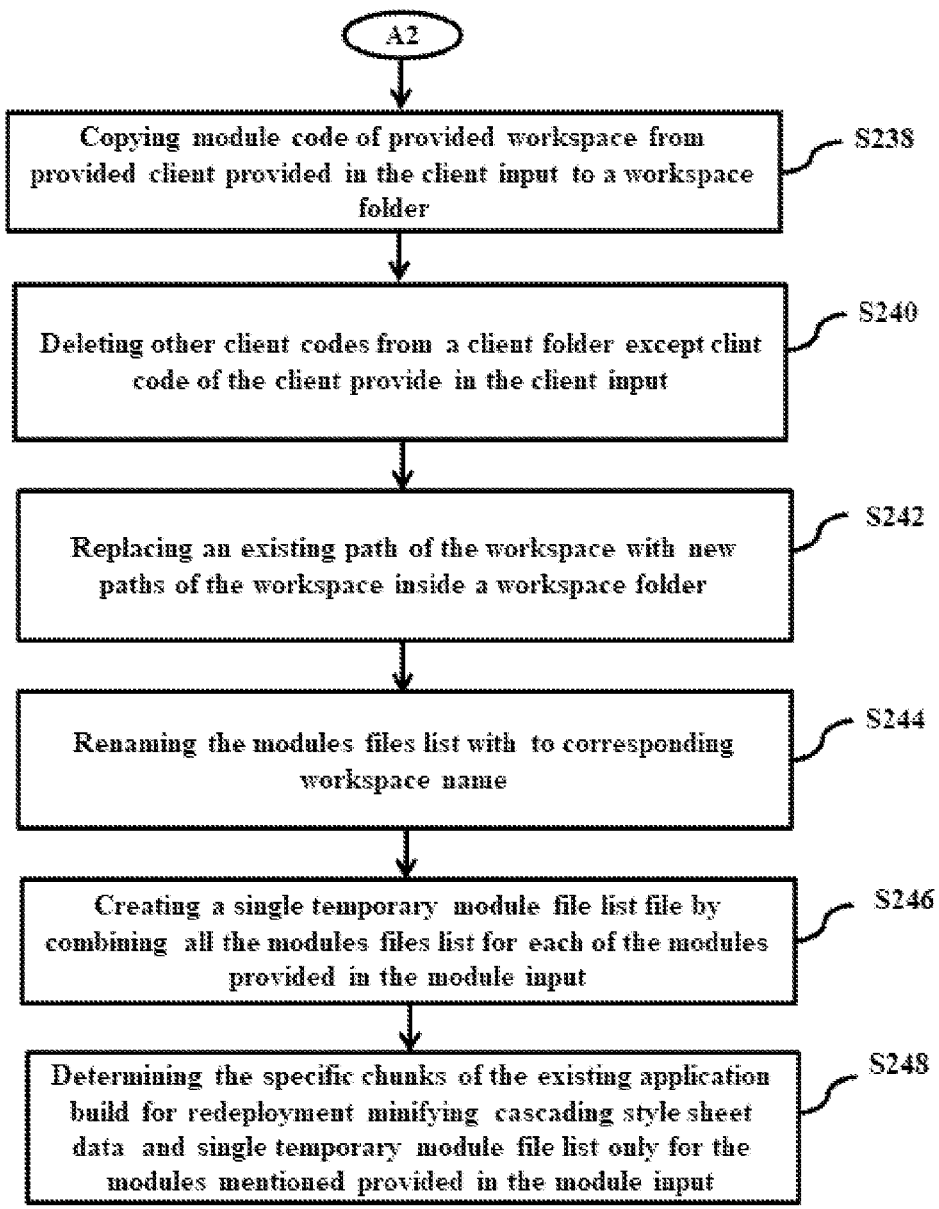
Figure 2E:
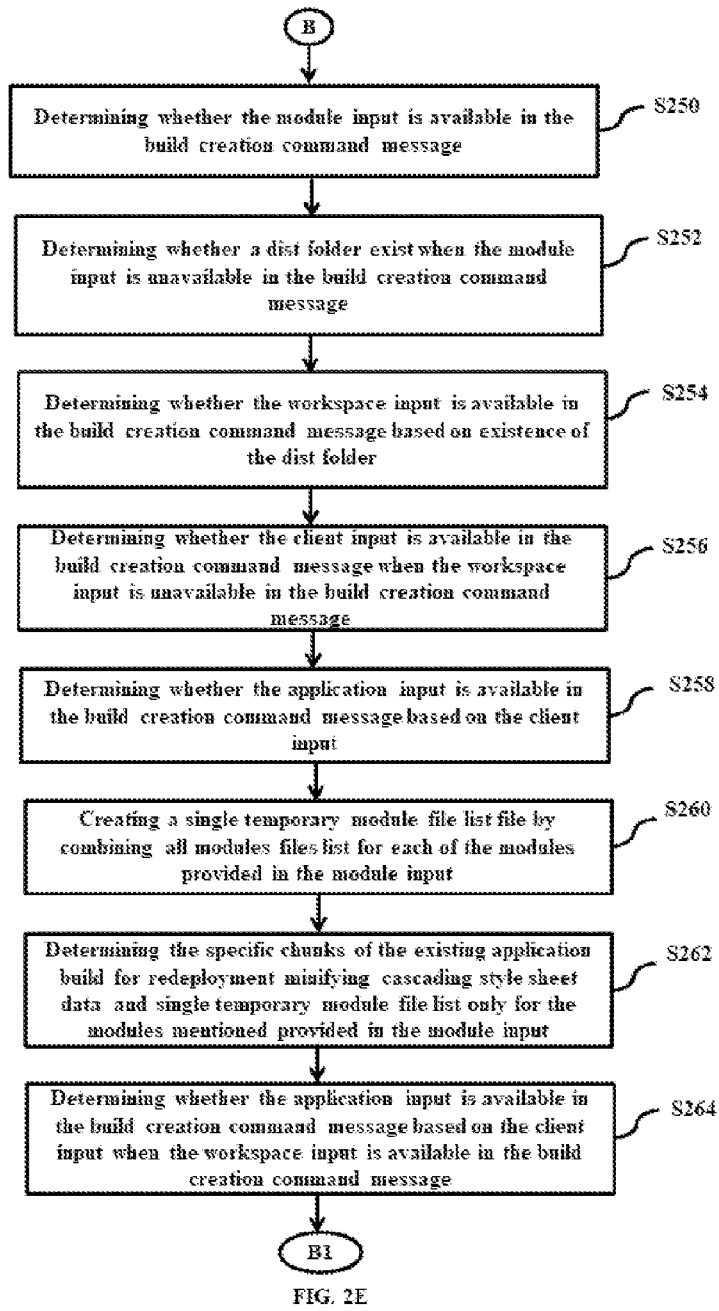
Figure 2F:
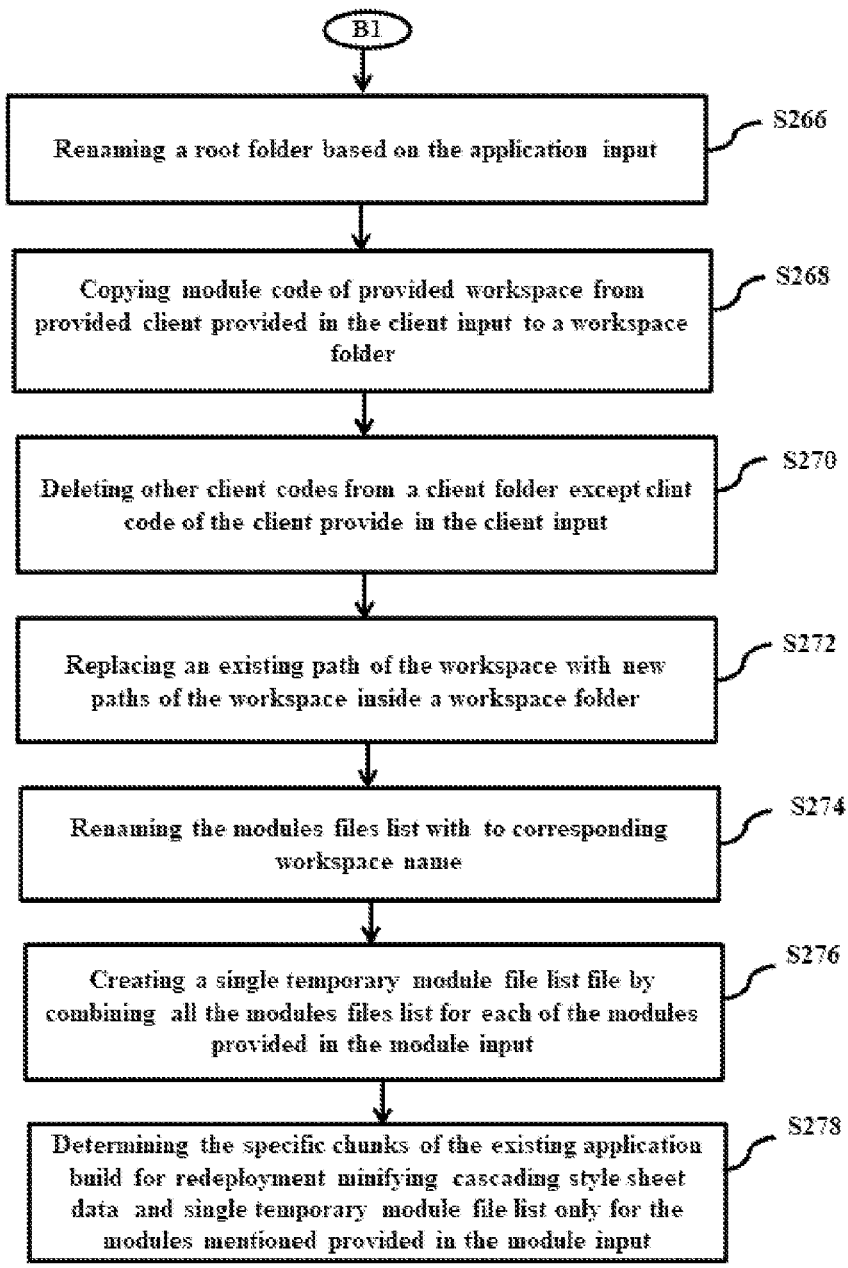
Figure 3A:
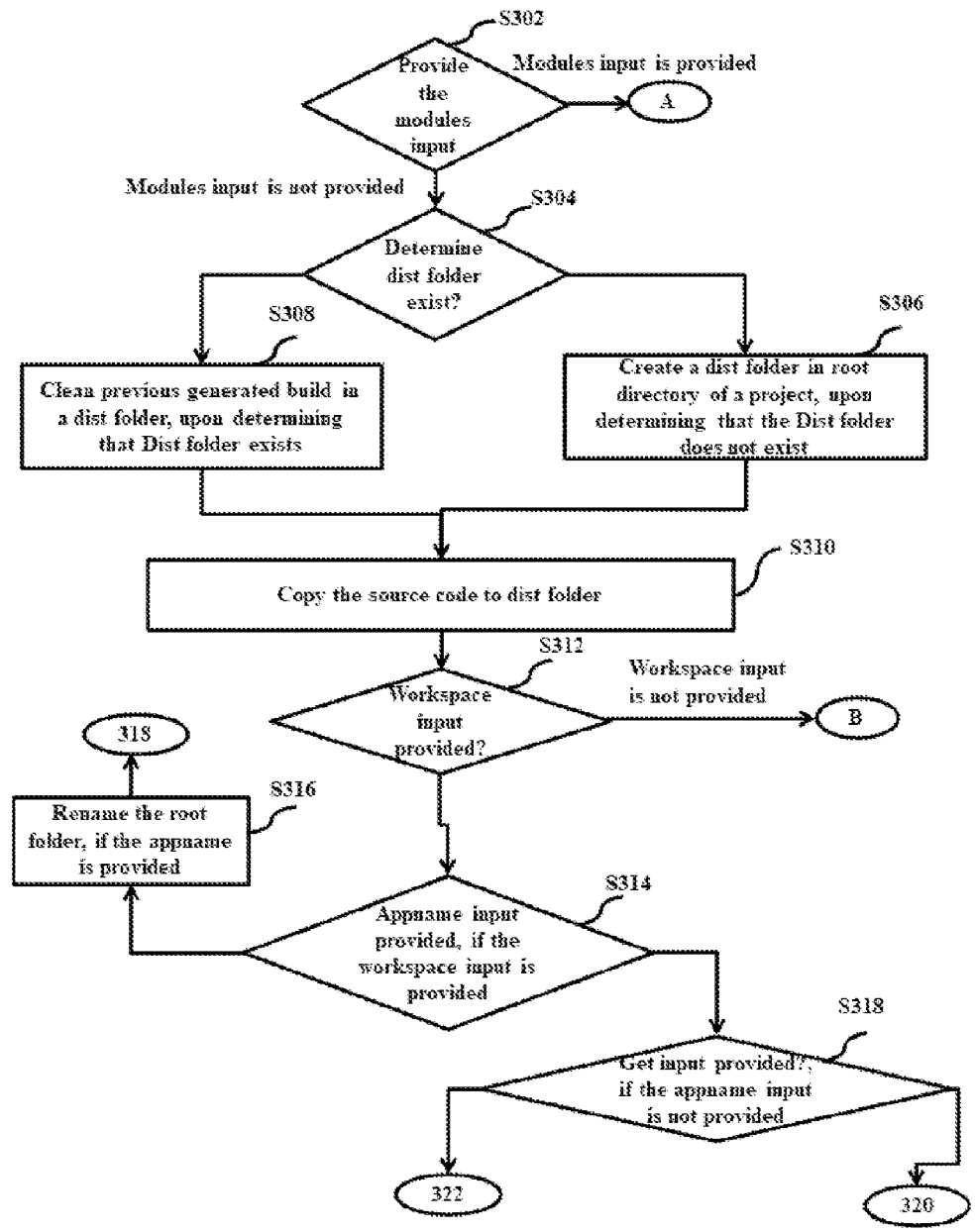
FIG. 3A to FIG. 3H are example flow charts illustrating a method for handling the redeployment of the existing application build, according to the embodiments as disclosed herein.
Figure 3B:
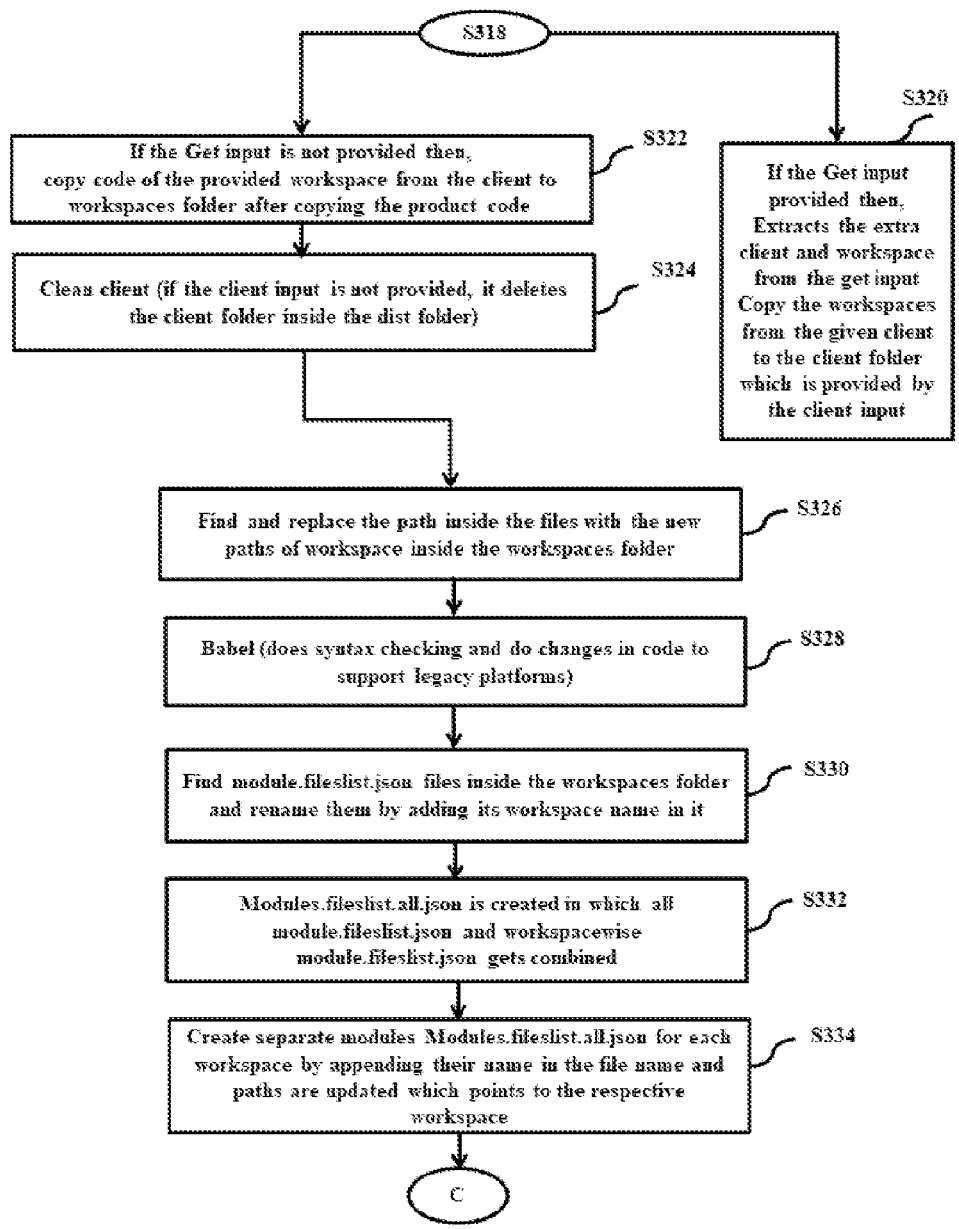
Figure 3C:
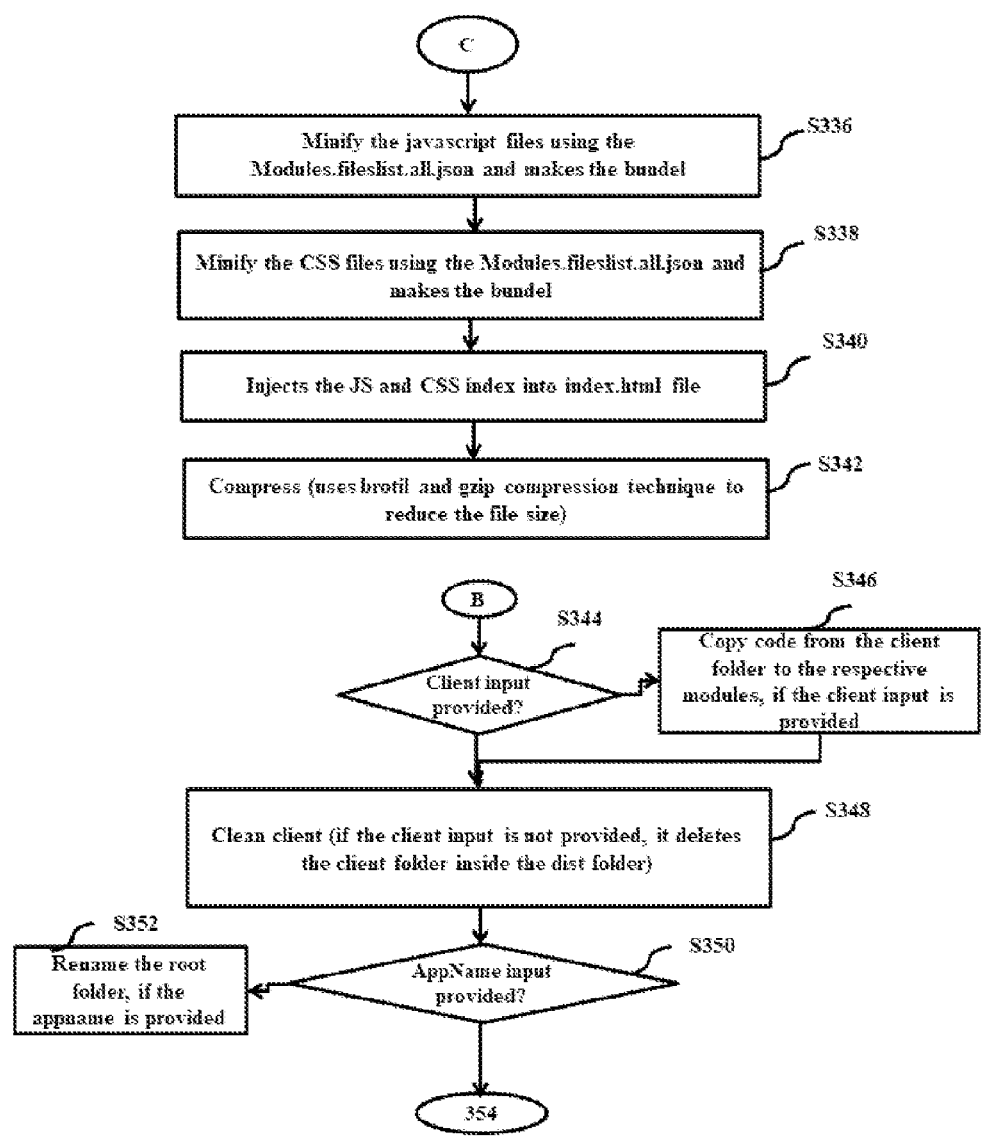
Figure 3D:
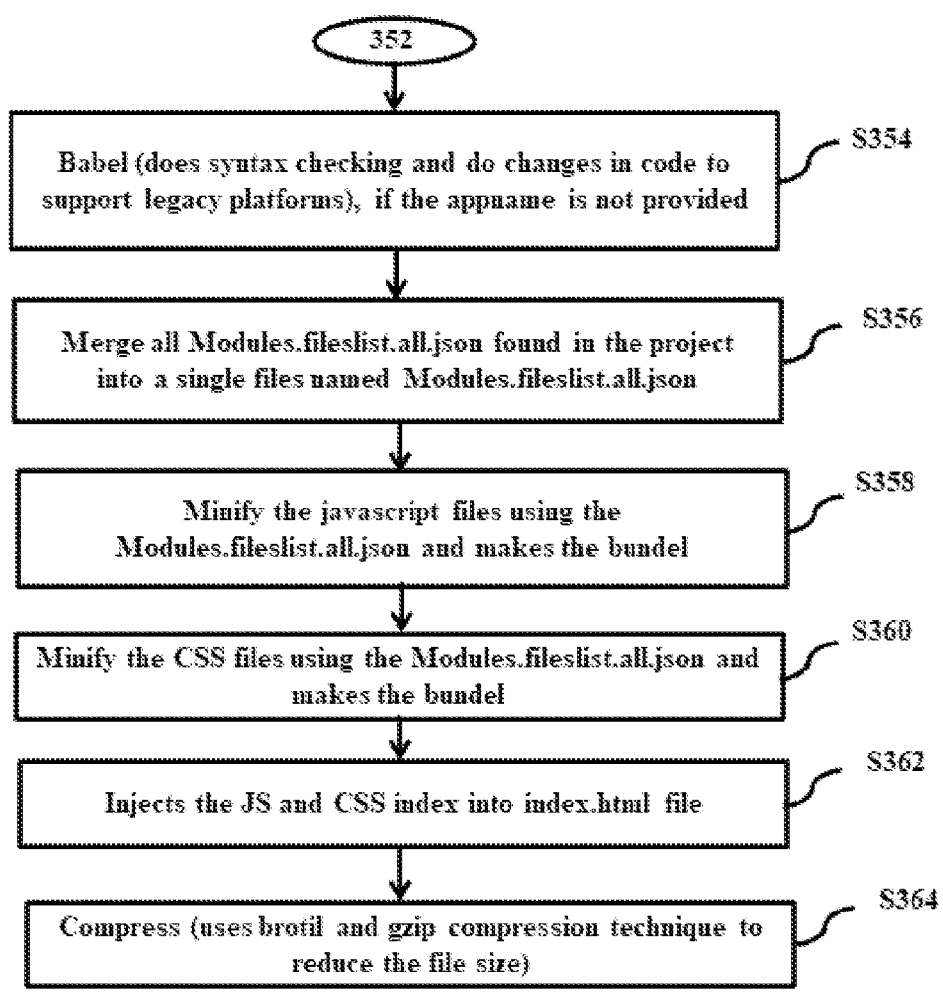
Figure 3E:
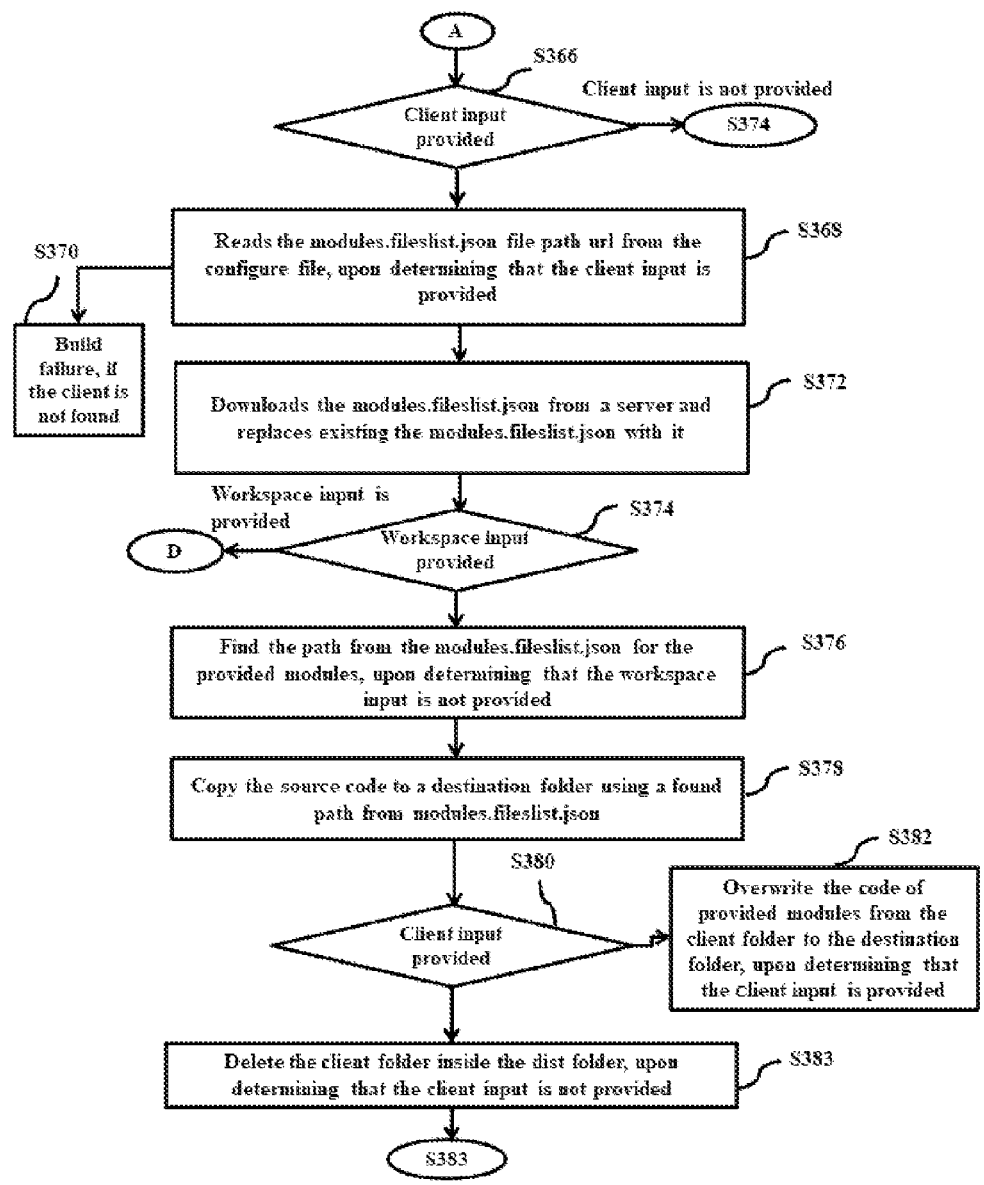
Figure 3F:
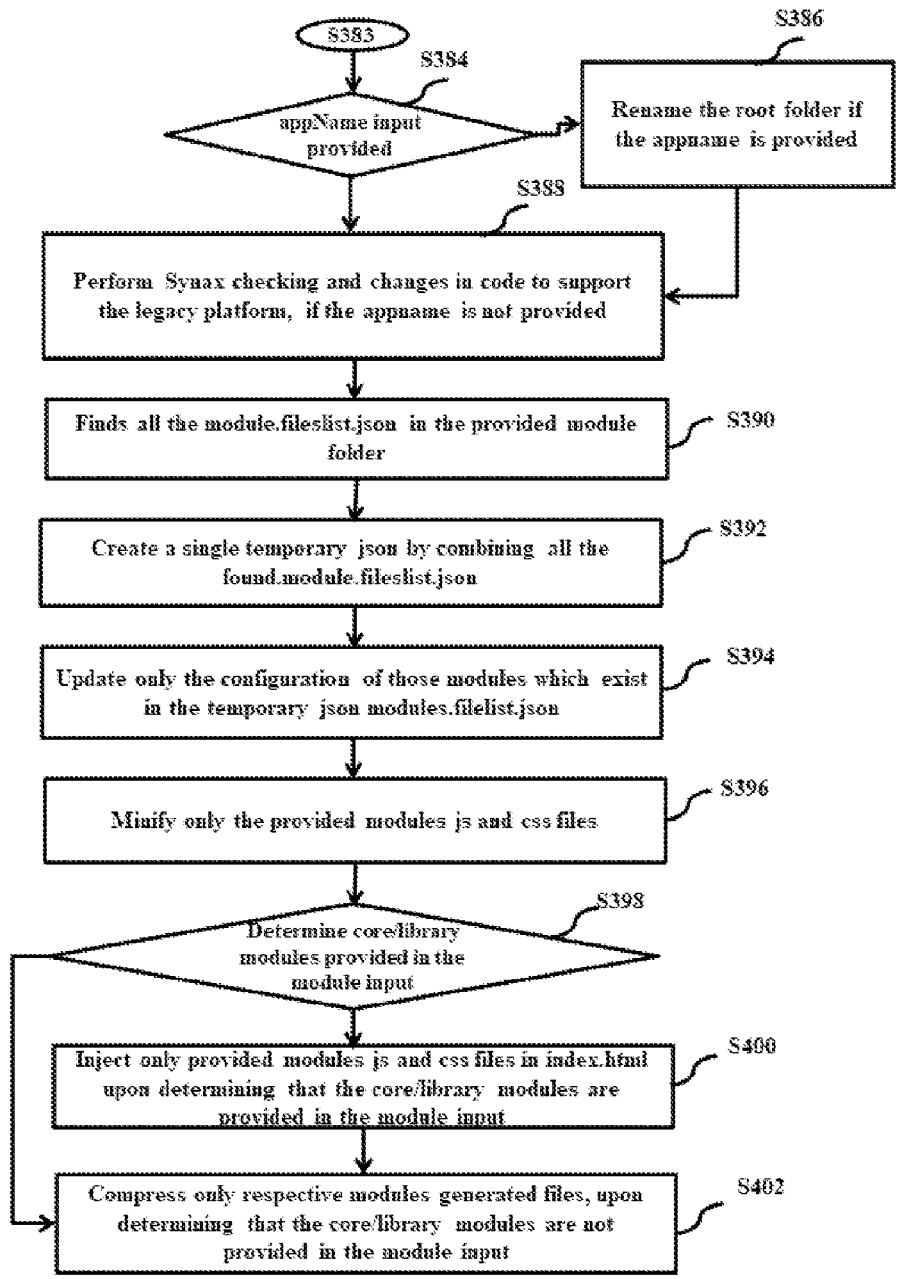
Figure 3G:
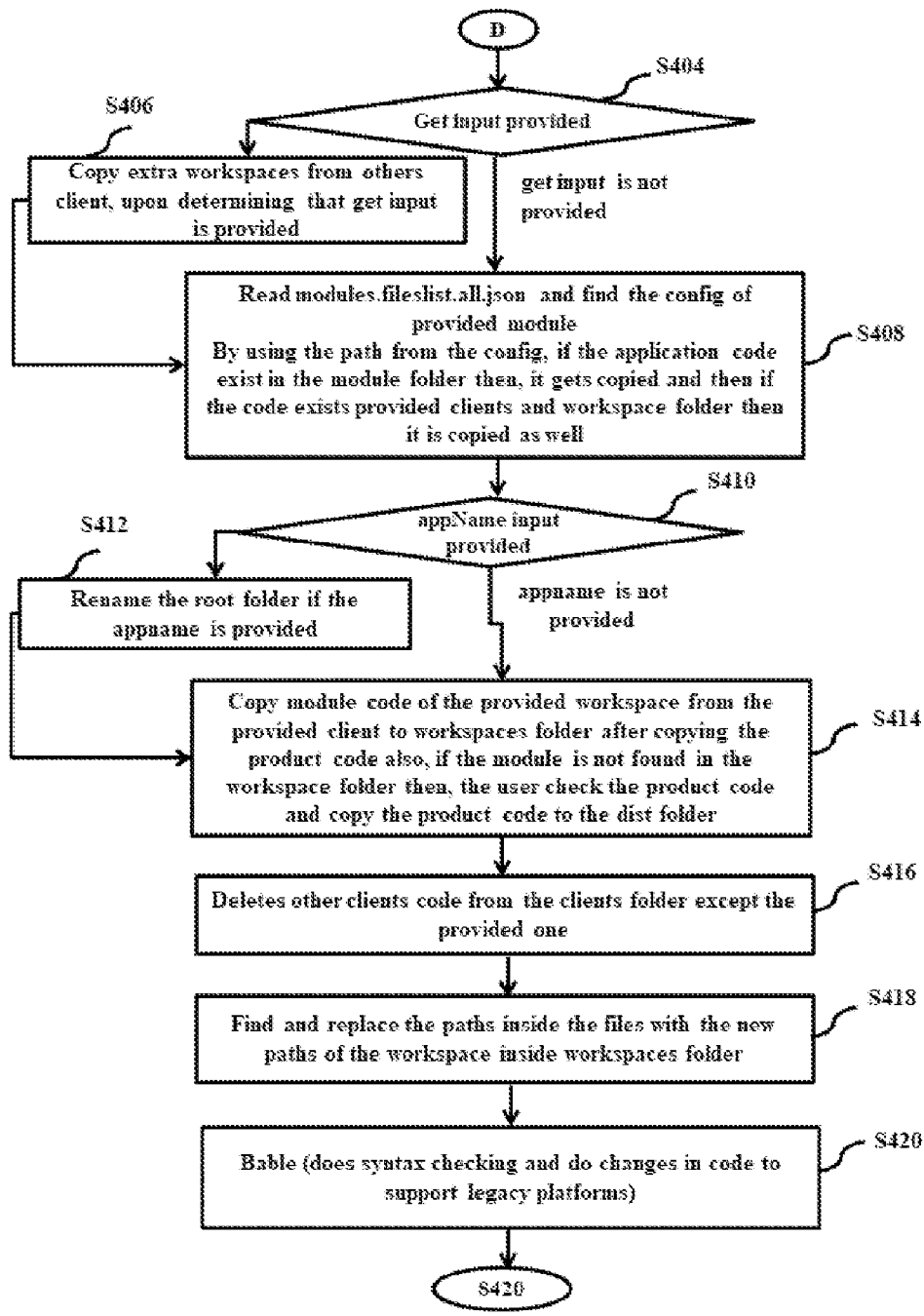
Figure 3H:
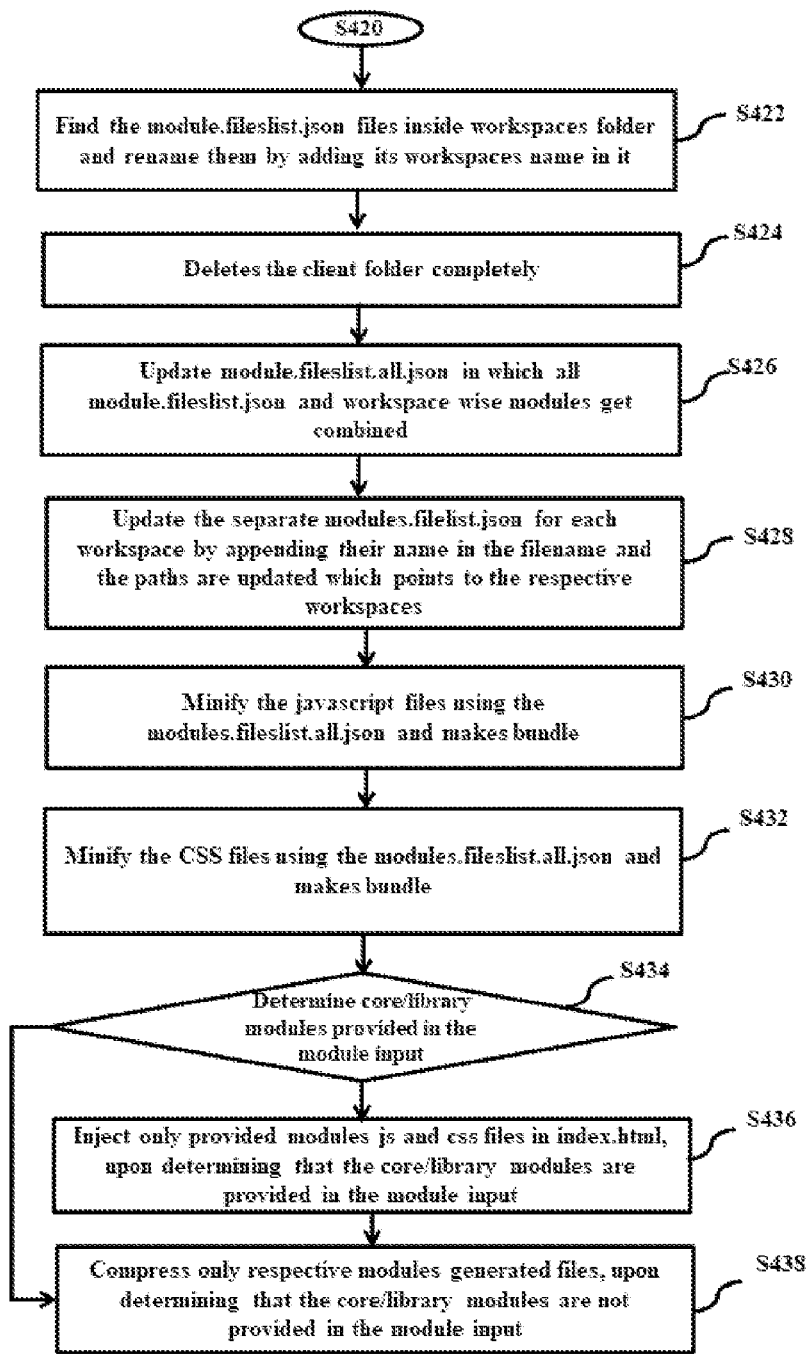

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiment herein is to provide a method for handling redeployment of an existing application build. The method includes receiving a build creation command message for redeployment of the existing application build. Further, the method includes determining availability of a module input, a client input, a workspace input, and an application input in the build creation command message. Further, the method includes determining specific chunks of the existing application build for redeployment based on the module input, the client input, the workspace input, and the application input available in the build creation command message. Further, the method includes redeploying the specific chunks of the existing application build.

Unlike conventional methods and systems, the proposed method can be used to enable a user to deploy small chunks (features) of the application that has to be fixed. The method enables the user to have a single repo that can manage the changes with respect to all the clients, there is no need to manage separate repos for each of the clients. An output of the method is lazy loading friendly. The process thoroughly checks the syntax error in the source code. The method is compatible with the legacy platforms.

The method allows the user to prepare and deploy the build of application services independently. The method has a set of processes which convert the source code to target code and allows to deploy the complete build and specific chunks (features).

Referring now to the drawings and more particularly to FIGS. 1 through 3H, where similar reference characters denote corresponding features consistently throughout the figures, there are shown preferred embodiments.

FIG. 1 is an example overview of a system (100) (or micro frontend framework) for handling redeployment of an existing application build, according to the embodiments as disclosed herein. The system (100) can be, for example, but not limited to a computer system, a host server, a personal computer, a smart phone, a Personal Digital Assistant (PDA), a tablet computer, a laptop computer, an Internet of Things (IoT), embedded systems, edge devices, a vehicle to everything (V2X) device or the like. In an embodiment, the (100) includes a processor (110), a communicator (120), a memory (130) and a micro frontend framework controller (140). The processor (110) is coupled with the communicator (120), the memory (130) and the micro frontend framework controller (140).

The micro frontend framework controller (140) receives a build creation command message for redeployment of an existing application build. Further, the micro frontend framework controller (140) determines availability of a module input, a client input, a workspace input, and an application input in the build creation command message. Based on the module input, the client input, the workspace input, and the application input available in the build creation command message, the micro frontend framework controller (140) determines specific chunks of the existing application build for redeployment. The chunk is minified to reduce its size. The chuck is the consolidated file of the module. The chunk gets loaded on browser when we open any module. Also, the chunk is encrypted by broth & gZip file encoding techniques to reduce the file size further.

In an embodiment, the micro frontend framework controller (140) determines whether the module input is available in the build creation command message. Further, the micro frontend framework controller (140) retrieves a file path URL of all modules provided in the module input from a config file when the module input is available in the build creation command message. Further, the micro frontend framework controller (140) downloads a modules files list for each of the modules from a server (not shown) using the file path URL. Further, the micro frontend framework controller (140) replaces an existing modules files list stored in the system with the downloaded modules files list for each of the modules. Further, the micro frontend framework controller (140) determines whether the client input is available in the build creation command message. Further, the micro frontend framework controller (140) determines whether the workspace input is available in the build creation command message when the client input are available in the build creation command message. Further, the micro frontend framework controller (140) copies a source code to a destination folder using a path retrieved from the modules files list when the workspace input is unavailable in the build creation command message. Further, the micro frontend framework controller (140) overrides a codebase for the module input provided into the build creation command message from a client folder to a destination folder based on the client input the build creation command message.

Further, the micro frontend framework controller (140) determines whether the application input is available in the build creation command message. Further, the micro frontend framework controller (140) renames a root folder based on the application input. Further, the micro frontend framework controller (140) creates a single temporary module file list file by combining all the modules files list for each of the modules provided in the module input. Further, the micro frontend framework controller (140) determines the specific chunks of the existing application build for redeployment minifying cascading style sheet data and single temporary module file list only for the modules mentioned provided in the module input.

Further, the micro frontend framework controller (140) copies an application code and a source code to a destination folder using a path retrieved from the modules files list when the workspace input is available in the build creation command message. Further, the micro frontend framework controller (140) determines whether the application input is available in the build creation command message. Further, the micro frontend framework controller (140) renames a root folder based on the application input. Further, the micro frontend framework controller (140) copies module code of provided workspace from provided client provided in the client input to a workspace folder. In an example, the workspace means a project/product can have multiple modules which only a specific type of customer uses, so collection of those modules is called as the workspace. In other words, the workspace can have same module which the customer of that workspace uses but there can also be the case where a module e.g., PM, CM, FM are required to work differently in a certain workspace, so in that case, only the changes are kept inside the particular workspace and in the process, they get merged on top of product code. Each module consists of multiple files, there files can be of any type, example—.js, .html, .java, .css etc. Further, every module has an unique identifier.

Further, the micro frontend framework controller (140) deletes other client codes from a client folder except clint code of the client provide in the client input. Further, the micro frontend framework controller (140) replaces an existing path of the workspace with new paths of the workspace inside a workspace folder. Further, the micro frontend framework controller (140) renames the modules files list with to corresponding workspace name. Further, the micro frontend framework controller (140) creates a single temporary module file list file by combining all the modules files list for each of the modules provided in the module input. Further, the micro frontend framework controller (140) determines the specific chunks of the existing application build for redeployment minifying cascading style sheet data and single temporary module file list only for the modules mentioned provided in the module input.

In another embodiment, the micro frontend framework controller (140) determines whether the module input is available in the build creation command message. Further, the micro frontend framework controller (140) determines whether a dist folder exist when the module input is unavailable in the build creation command message. Further, the micro frontend framework controller (140) determines whether the workspace input is available in the build creation command message based on existence of the dist folder. Further, the micro frontend framework controller (140) determines whether the client input is available in the build creation command message when the workspace input is unavailable in the build creation command message. Further, the micro frontend framework controller (140) determines whether the application input is available in the build creation command message based on the client input. Further, the micro frontend framework controller (140) creates a single temporary module file list file by combining all modules files list for each of the modules provided in the module input. Further, the micro frontend framework controller (140) determines the specific chunks of the existing application build for redeployment minifying cascading style sheet data and single temporary module file list only for the modules mentioned provided in the module input.

Further, the micro frontend framework controller (140) determines whether the application input is available in the build creation command message based on the client input when the workspace input is available in the build creation command message. Based on the application input, the micro frontend framework controller (140) renames a root folder. Further, the micro frontend framework controller (140) copies a module code of provided workspace from the provided client provided in the client input to the workspace folder. Further, the micro frontend framework controller (140) deletes other client codes from the client folder except clint code of the client provide in the client input. Further, the micro frontend framework controller (140) replaces an existing path of the workspace with new paths of the workspace inside a workspace folder. Further, the micro frontend framework controller (140) renames the modules files list with to corresponding workspace name. Further, the micro frontend framework controller (140) creates a single temporary module file list file by combining all the modules files list for each of the modules provided in the module input. Further, the micro frontend framework controller (140) determines the specific chunks of the existing application build for redeployment minifying cascading style sheet data and single temporary module file list only for the modules mentioned provided in the module input.

Further, the micro frontend framework controller (140) redeploys the specific chunks of the existing application build. In an embodiment, the micro frontend framework controller (140) determines whether the specific chunks of the existing application build belong to core or library modules provided in the module input. When the specific chunks of the existing application build belong to core or library modules provided in the module input, the micro frontend framework controller (140) injects the specific chunks of the existing application build into an index file of the application, and compresses the specific chunks of the existing application build to reduce the size. When the specific chunks of the existing application build does not belong to core or library modules provided in the module input, the micro frontend framework controller (140) compresses the specific chunks of the existing application build to reduce the size.

Further, the micro frontend framework controller (140) deletes the client folder inside the destination folder by running a clean-client command irrespective of availability of client name in the client input provided in the build creation command message.

Further, the micro frontend framework controller (140) copies the source code related to modules irrespective of availability of modules in the module input provided in the build creation command message to support a legacy platform (not shown).

The micro frontend framework controller (140) can be used to enable a user to deploy small chunks (features) of the application that has to be fixed. By using the micro frontend framework controller (140), the method enables the user to have a single repo that can manage the changes with respect to all the clients, there is no need to manage separate repos for each of the clients. The output of the method is lazy loading friendly. The process thoroughly checks the syntax error in the source code. The system and the micro frontend framework controller (140) is compatible with the legacy platforms.

The micro frontend framework controller (140) is implemented by analog and/or digital circuits such as logic gates, integrated circuits, the processor (110), microprocessors, microcontrollers, memory circuits, passive electronic components, active electronic components, optical components, hardwired circuits and the like, and may optionally be driven by firmware.

Further, the processor (110) is configured to execute instructions stored in the memory (130) and to perform various processes. The communicator (120) is configured for communicating internally between internal hardware components and with external devices via one or more networks. The memory (130) also stores instructions to be executed by the processor (110). The memory (130) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory (130) is non-movable. In certain examples, a non-transitory storage medium may store data that can, over time, change (e.g., in Random Access Memory (RAM) or cache).

Although the FIG. 1 shows various hardware components of the system (100) but it is to be understood that other embodiments are not limited thereon. In other embodiments, the system (100) may include less or more number of components. Further, the labels or names of the components are used only for illustrative purpose and does not limit the scope of the invention. One or more components can be combined together to perform same or substantially similar function in the system (100).

FIG. 2A to FIG. 2F are flow charts (S200) illustrating a method for handling the redeployment of the existing application build, according to the embodiments as disclosed herein. The operations (S202-S284) are handled by the micro frontend framework controller (140).

At S202, the method includes receiving the build creation command message for redeployment of the existing application build. At S204, the method includes determining the availability of the module input, the client input, the workspace input, and the application input in the build creation command message.

In an embodiment, at S208, the method includes determining whether the module input is available in the build creation command message. At S210, the method includes retrieving the file path URL of all modules provided in the module input from the config file when the module input is available in the build creation command message. At S212, the method includes downloading the modules files list for each of the modules from the server using the file path URL. At S214, the method includes replacing the existing modules files list stored in the system with the downloaded modules files list for each of the modules. At S216, the method includes determining whether the client input is available in the build creation command message. At S218, the method includes determining whether the workspace input is available in the build creation command message when the client input are available in the build creation command message. At S220, the method includes copying the source code to the destination folder using the path retrieved from the modules files list when the workspace input is unavailable in the build creation command message. At S222, the method includes overriding the codebase for the module input provided into the build creation command message from the client folder to the destination folder based on the client input the build creation command message. At S224, the method includes determining whether the application input is available in the build creation command message. At S226, the method includes renaming the root folder based on the application input. At S228, the method includes creating the single temporary module file list file by combining all the modules files list for each of the modules provided in the module input. At S230, the method includes determining the specific chunks of the existing application build for redeployment minifying cascading style sheet data and the single temporary module file list only for the modules mentioned provided in the module input.

At S232, the method includes copying the application code and the source code to the destination folder using the path retrieved from the modules files list when the workspace input is available in the build creation command message. At S234, the method includes determining whether the application input is available in the build creation command message. At S236, the method includes renaming the root folder based on the application input. At S238, the method includes copying the module code of provided workspace from the provided client provided in the client input to the workspace folder. At S240, the method includes deleting other client codes from the client folder except clint code of the client provide in the client input.

At S242, the method includes replacing the existing path of the workspace with new paths of the workspace inside the workspace folder. At S244, the method includes renaming the modules files list with to corresponding workspace name. At S246, the method includes creating the single temporary module file list file by combining all the modules files list for each of the modules provided in the module input. At S248, the method includes determining the specific chunks of the existing application build for redeployment minifying cascading style sheet data and single temporary module file list only for the modules mentioned provided in the module input.

In another embodiment, at S250, the method includes determining whether the module input is available in the build creation command message. At S252, the method includes determining whether the dist folder exist when the module input is unavailable in the build creation command message. At S254, the method includes determining whether the workspace input is available in the build creation command message based on existence of the dist folder. At S256, the method includes determining whether the client input is available in the build creation command message when the workspace input is unavailable in the build creation command message. At S258, the method includes determining whether the application input is available in the build creation command message based on the client input.

At S260, the method includes creating the single temporary module file list file by combining all modules files list for each of the modules provided in the module input. At S262, the method includes determining the specific chunks of the existing application build for redeployment minifying cascading style sheet data and single temporary module file list only for the modules mentioned provided in the module input. At S264, the method includes determining whether the application input is available in the build creation command message based on the client input when the workspace input is available in the build creation command message. At S266, the method includes renaming the root folder based on the application input. At S268, the method includes copying module code of provided workspace from provided client provided in the client input to the workspace folder. At S270, the method includes deleting other client codes from the client folder except clint code of the client provide in the client input. At S272, the method includes replacing the existing path of the workspace with new paths of the workspace inside the workspace folder. At S274, the method includes renaming the modules files list with to corresponding workspace name. At S276, the method includes creating the single temporary module file list file by combining all the modules files list for each of the modules provided in the module input. At S278, the method includes determining the specific chunks of the existing application build for redeployment minifying cascading style sheet data and single temporary module file list only for the modules mentioned provided in the module input.

At S280, the method includes determining whether the specific chunks of the existing application build belong to the core modules or the library modules provided in the module input. At S282, the method includes injecting the specific chunks of the existing application build into an index file of the application, and compressing the specific chunks of the existing application build to reduce the size when the specific chunks of the existing application build belong to the core or library modules provided in the module input. At S284, the method includes compressing the specific chunks of the existing application build to reduce the size when the specific chunks of the existing application build does not belong to core or library modules provided in the module input.

The example operations corresponding to FIG. 2 is explained in FIG. 3A to FIG. 3H.

FIG. 3A to FIG. 3H are example flow charts (S300) illustrating a method for handling the redeployment of the existing application build, according to the embodiments as disclosed herein. The operations (S302-S438) are handled by the micro frontend framework controller (140).

At S302, the method includes determining whether the modules input is provided. If the modules input is not provided then, at S304, the method includes determining whether the dist folder exists? If the dist folder exists then, at S306, the method includes cleaning the previous generated build in the dist folder. If the dist folder does not exist then, at S308, the method includes creating the dist folder in the root directory of the project. At S310, the method includes copying the source code to the dist folder.

At S312, the method includes determining whether the workspace input is provided? If the workspace input is provided then, at S314, the method includes determining whether the appname input is provided? In response to determining that the appname input is provided then, at S316, the method includes renaming the root folder.

At S318, the method includes determining whether the get input is provided? If the get input is provided then, at S320, the method includes extracting the extra client and workspace from the get input and copying the workspaces from the given client to the client folder which is provided by the client input. If the get input is not provided then, at S322, the method includes copying the code of the provided workspace from the client to workspaces folder after copying the product code. At S324, the method includes cleaning the client (i.e., if the client input is not provided, it deletes the client folder inside the dist folder).

At S326, the method includes finding and replacing the path inside the files with the new paths of the workspace inside the workspaces folder. At S328, the method includes providing the Babel (i.e., does syntax checking and do changes in code to support legacy platforms). At S330, the method includes finding module.fileslist.json files inside the workspaces folder and renaming them by adding its workspace name in it. At S332, the method includes creating modules.fileslist.all.json in which all module.fileslist.json and workspacewise module.fileslist.json gets combined. At S334, the method includes creating the separate modules Modules.fileslist.all.json for each workspace by appending their name in the file name and paths are updated which points to the respective workspace. At S336, the method includes minifying the javascript files using the Modules.fileslist.all.json and making the bundel. At S338, the method includes minifying the CSS files using the Modules.fileslist.all.json and making the bundel. At S340, the method includes injecting the JS and CSS index into index.html file. At S342, the method includes compressing the file size (using brotil and gzip compression technique to reduce the file size).

At S344, the method includes determining whether the client input is provided? If the client input is provided then, at S346, the method includes copying the code from the client folder to the respective modules. If the client input is not provided then, At S348, the method includes cleaning the client (i.e., if the client input is not provided, it deletes the client folder inside the dist folder).

At S350, the method includes determining whether the AppName input is provided? If the AppName input is provided then, at S352, the method includes renaming the root folder.

If the AppName input is not provided then, At S354, the method includes providing the Babel (i.e., does syntax checking and do changes in code to support legacy platforms).

At S356, the method includes merging all Modules.fileslist.all.json found in the project into a single files named Modules.fileslist.all.json. At S358, the method includes minifying the javascript files using the Modules.fileslist.all.json and making the bundel. At S360, the method includes minifying the CSS files using the Modules.fileslist.all.json and making the bundel. At S362, the method includes injecting the JS and CSS index into index.html file. At S364, the method includes compressing the file size (uses brotil and gzip compression technique to reduce the file size).

At S366, the method includes determining whether the client input is provided? If the client input is provided then at S368, the method includes reading the modules.fileslist.json file path url from the configure file. At S370, the method includes building the failure, if the client is not found. At S372, the method includes downloading the modules.fileslist.json from the server and replaces existing the modules.fileslist.json with it.

If the client input is not provided then, at S374, the method includes determining whether the workspace input is provided? If the workspace input is provided then, at S376, the method includes finding the path from the modules.fileslist.json for the provided modules. At S378, the method includes copying the source code to the destination folder using a found path from modules.fileslist.json. At S380, the method includes determining whether the client input is provided? If the client input is provided then, at S382, the method includes overwriting the code of provided modules from the client folder to the destination folder. If the client input is not provided then, at S383, the method includes deleting the client folder inside the dist folder.

At S384, the method includes determining whether the appName input is provided? If the appName input is provided then, at S386, the method includes renaming the root folder. If the appName input is not provided then, at S388, the method includes performing a syntax checking and changes in code to support the legacy platform.

At S390, the method includes finding all the module.fileslist.json in the provided module folder. At S392, the method includes creating the single temporary json by combining all the found.module.fileslist.json. At S394, the method includes updating only the configuration of those modules which exist in the temporary json modules.filelist.json. At S396, the method includes minifying only the provided modules js and css files. At S398, the method includes determining core/library modules provided in the module input. If the core/library modules is provided in the module input, at S400, the method includes Inject only provided modules js and css files in index.html. If the core/library modules is not provided in the module input, at S402, the method includes compressing only respective modules generated files.

At S404, the method includes determining whether the get input provided. If the get input is provided then, at S406, the method includes copying the extra workspaces from others client. If the get input is not provided then, At S408, the method includes reading modules.fileslist.all.json and finding the config of the provided module. By using the path from the config, if the application code exist in the module folder then, it gets copied and then if the code exists provided clients and workspace folder then it is copied as well.

At S410, the method includes determining whether the appName input provided. If the appName input is provided then, at S412, the method includes renaming the root folder. If the appname is not provided then, at S414, the method includes copying the module code of the provided workspace from the provided client to workspaces folder after copying the product code also, if the module is not found in the workspace folder then, the user check the product code and copy the product code to the dist folder.

At S416, the method includes deleting the other clients code from the clients folder except the provided one. At S418, the method includes finding and replacing the paths inside the files with the new paths of the workspace inside workspaces folder. At S420, the method includes performing the Bable (i.e., does syntax checking and do changes in code to support legacy platforms)

At S422, the method includes finding the module.fileslist.json files inside workspaces folder and renaming them by adding its workspaces name in it. At S424, the method includes deleting the client folder completely. At S426, the method includes updating the module.fileslist.all.json in which all module.fileslist.json and workspace wise modules get combined. At S428, the method includes updating the separate modules.filelist.json for each workspace by appending their name in the filename and the paths are updated which points to the respective workspaces. At S430, the method includes minifying the javascript files using the modules.fileslist.all.json and makes bundle. At S432, the method includes minifying the CSS files using the modules.fileslist.all.json and making the bundle. At S434, the method includes determining the core/library modules provided in the module input. If the core/library modules are provided in the module input then, at S436, the method includes injecting only provided modules js and css files in index.html. If the core/library modules are not provided in the module input then, At S438, the method includes compressing only respective modules generated files.

The method can be used to enable a user to deploy small chunks (features) of the application that has to be fixed. The method enables the user to have a single repo that can manage the changes with respect to all the clients, there is no need to manage separate repos for each of the clients. The output of the method is lazy loading friendly. The process thoroughly checks the syntax error in the source code. The method is compatible with the legacy platforms.

The various actions, acts, blocks, steps, or the like in the flow charts (S200 and S300) may be performed in the order presented, in a different order or simultaneously. Further, in some embodiments, some of the actions, acts, blocks, steps, or the like may be omitted, added, modified, skipped, or the like without departing from the scope of the invention.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

We claim:

1. A system for redeployment of an existing application build, wherein the system comprises:
   at least one processor; and
   a memory operatively coupled to the at least one processor, the at least one processor configured to perform operations comprising:
   receiving a build creation command message for redeployment of the existing application build;
   determining availability of a module input, a client input, a workspace input, and an application input in the build creation command message;
   determining specific chunks of the existing application build for redeployment based on the module input, the client input, the workspace input, and the application input available in the build creation command message; and
   redeploying the specific chunks of the existing application build.

2. The system as claimed in claim 1, wherein determining the specific chunks of the existing application build for redeployment comprises:
   determining whether the module input is available in the build creation command message;
   retrieving a file path URL of all modules provided in the module input from a config file when the module input is available in the build creation command message;
   downloading a modules files list for each of the modules from a server using the file path URL;
   replacing an existing modules files list stored in the system with the downloaded modules files list for each of the modules;
   determining whether the client input is available in the build creation command message;
   determining whether the workspace input is available in the build creation command message when the client input are available in the build creation command message;
   copying a source code to a destination folder using a path retrieved from the modules files list when the workspace input is unavailable in the build creation command message;
   overriding a codebase for the module input provided into the build creation command message from a client folder to a destination folder based on the client input the build creation command message;
   determining whether the application input is available in the build creation command message;
   renaming a root folder based on the application input;
   creating a single temporary module file list file by combining all the modules files list for each of the modules provided in the module input; and
   determining the specific chunks of the existing application build for redeployment minifying cascading style sheet data and single temporary module file list only for the modules mentioned provided in the module input.

3. The system as claimed in claim 2, wherein the method comprises:
   copying an application code and a source code to a destination folder using a path retrieved from the modules files list when the workspace input is available in the build creation command message;
   determining whether the application input is available in the build creation command message;
   renaming a root folder based on the application input;
   copying module code of provided workspace from provided client provided in the client input to a workspace folder;
   deleting other client codes from a client folder except clint code of the client provide in the client input;
   replacing an existing path of the workspace with new paths of the workspace inside a workspace folder;
   renaming the modules files list with to corresponding workspace name;
   creating a single temporary module file list file by combining all the modules files list for each of the modules provided in the module input; and
   determining the specific chunks of the existing application build for redeployment minifying cascading style sheet data and single temporary module file list only for the modules mentioned provided in the module input.

4. The system as claimed in claim 1, wherein determining the specific chunks of the existing application build for redeployment comprises:
   determining whether the module input is available in the build creation command message;
   determining whether a dist folder exist when the module input is unavailable in the build creation command message;
   determining whether the workspace input is available in the build creation command message based on existence of the dist folder;
   determining whether the client input is available in the build creation command message when the workspace input is unavailable in the build creation command message;
   determining whether the application input is available in the build creation command message based on the client input;
   creating a single temporary module file list file by combining all modules files list for each of the modules provided in the module input; and
   determining the specific chunks of the existing application build for redeployment minifying cascading style sheet data and single temporary module file list only for the modules mentioned provided in the module input.

5. The system as claimed in claim 4, wherein the method comprises:
   determining whether the application input is available in the build creation command message based on the client input when the workspace input is available in the build creation command message;
   renaming a root folder based on the application input;
   copying module code of provided workspace from provided client provided in the client input to a workspace folder;
   deleting other client codes from a client folder except clint code of the client provide in the client input;
   replacing an existing path of the workspace with new paths of the workspace inside a workspace folder;
   renaming the modules files list with to corresponding workspace name;
   creating a single temporary module file list file by combining all the modules files list for each of the modules provided in the module input; and
   determining the specific chunks of the existing application build for redeployment minifying cascading style sheet data and single temporary module file list only for the modules mentioned provided in the module input.

6. The system as claimed in claim 1, wherein redeploying the specific chunks of the existing application build comprises:
   determining whether the specific chunks of the existing application build belong to core or library modules provided in the module input;
   when the specific chunks of the existing application build belong to core or library modules provided in the module input, injecting the specific chunks of the existing application build into an index file of the application, and compressing the specific chunks of the existing application build to reduce the size; and
   when the specific chunks of the existing application build does not belong to core or library modules provided in the module input, compressing the specific chunks of the existing application build to reduce the size.

7. The system as claimed in claim 1, wherein the at least one processor configured to perform operations comprising deleting client folder inside a destination folder by running a clean-client command irrespective of availability of client name in the client input provided in the build creation command message.

8. The system as claimed in claim 1, wherein the at least one processor configured to perform operations copying a source code related to modules irrespective of availability of modules in the module input provided in the build creation command message to support a legacy platform.

9. A method for handling redeployment of an existing application build, wherein the method comprises:
   receiving a build creation command message for redeployment of the existing application build;
   determining availability of a module input, a client input, a workspace input, and an application input in the build creation command message;
   determining specific chunks of the existing application build for redeployment based on the module input, the client input, the workspace input, and the application input available in the build creation command message; and
   redeploying the specific chunks of the existing application build.

10. The method as claimed in claim 9, wherein determining the specific chunks of the existing application build for redeployment comprises:
    determining whether the module input is available in the build creation command message;
    retrieving a file path URL of all modules provided in the module input from a config file when the module input is available in the build creation command message;
    downloading a modules files list for each of the modules from a server using the file path URL;
    replacing an existing modules files list stored in the system with the downloaded modules files list for each of the modules;
    determining whether the client input is available in the build creation command message;
    determining whether the workspace input is available in the build creation command message when the client input are available in the build creation command message;
    copying a source code to a destination folder using a path retrieved from the modules files list when the workspace input is unavailable in the build creation command message;
    overriding a codebase for the module input provided into the build creation command message from a client folder to a destination folder based on the client input the build creation command message;
    determining whether the application input is available in the build creation command message;
    renaming a root folder based on the application input;
    creating a single temporary module file list file by combining all the modules files list for each of the modules provided in the module input; and
    determining the specific chunks of the existing application build for redeployment minifying cascading style sheet data and single temporary module file list only for the modules mentioned provided in the module input.

11. The method as claimed in claim 10, wherein the method comprises:
    copying an application code and a source code to a destination folder using a path retrieved from the modules files list when the workspace input is available in the build creation command message;
    determining whether the application input is available in the build creation command message;
    renaming a root folder based on the application input;
    copying module code of provided workspace from provided client provided in the client input to a workspace folder;
    deleting other client codes from a client folder except clint code of the client provide in the client input;
    replacing an existing path of the workspace with new paths of the workspace inside a workspace folder;
    renaming the modules files list with to corresponding workspace name;
    creating a single temporary module file list file by combining all the modules files list for each of the modules provided in the module input; and
    determining the specific chunks of the existing application build for redeployment minifying cascading style sheet data and single temporary module file list only for the modules mentioned provided in the module input.

12. The method as claimed in claim 9, wherein determining the specific chunks of the existing application build for redeployment comprises:
    determining whether the module input is available in the build creation command message;
    determining whether a dist folder exist when the module input is unavailable in the build creation command message;
    determining whether the workspace input is available in the build creation command message based on existence of the dist folder;
    determining whether the client input is available in the build creation command message when the workspace input is unavailable in the build creation command message;
    determining whether the application input is available in the build creation command message based on the client input;
    creating a single temporary module file list file by combining all modules files list for each of the modules provided in the module input; and
    determining the specific chunks of the existing application build for redeployment minifying cascading style sheet data and single temporary module file list only for the modules mentioned provided in the module input.

13. The method as claimed in claim 12, wherein the method comprises:
    determining whether the application input is available in the build creation command message based on the client input when the workspace input is available in the build creation command message;

renaming a root folder based on the application input;

copying module code of provided workspace from provided client provided in the client input to a workspace folder;

deleting other client codes from a client folder except clint code of the client provide in the client input;

replacing an existing path of the workspace with new paths of the workspace inside a workspace folder;

renaming the modules files list with to corresponding workspace name;

creating a single temporary module file list file by combining all the modules files list for each of the modules provided in the module input; and determining the specific chunks of the existing application build for redeployment minifying cascading style sheet data and single temporary module file list only for the modules mentioned provided in the module input.

14. The method as claimed in claim 9, wherein redeploying the specific chunks of the existing application build comprises:

determining whether the specific chunks of the existing application build belong to core or library modules provided in the module input;

when the specific chunks of the existing application build belong to core or library modules provided in the module input, injecting the specific chunks of the existing application build into an index file of the application, and compressing the specific chunks of the existing application build to reduce the size; and when the specific chunks of the existing application build does not belong to core or library modules provided in the module input, compressing the specific chunks of the existing application build to reduce the size.

15. The method as claimed in claim 9, wherein the method comprises performing operations comprising deleting client folder inside a destination folder by running a clean-client command irrespective of availability of client name in the client input provided in the build creation command message.

16. The method as claimed in claim 9, wherein the method comprises performing operations comprising copying a source code related to modules irrespective of availability of modules in the module input provided in the build creation command message to support a legacy platform.

* * * * *